(12) United States Patent
Zaiser et al.

(10) Patent No.: US 8,240,325 B2
(45) Date of Patent: *Aug. 14, 2012

(54) GAS FLOW DEVICE

(75) Inventors: LeNoir E. Zaiser, Naples, FL (US); Kevin Confoy, Naples, FL (US)

(73) Assignee: Inovo, Inc., Naples, FL (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/546,652

(22) Filed: Aug. 24, 2009

(65) Prior Publication Data

US 2010/0101654 A1    Apr. 29, 2010

Related U.S. Application Data (63) Continuation of application No. 11/074,295, filed on Mar. 7, 2005, now Pat. No. 7,578,311.

(60) Provisional application No. 60/565,657, filed on Apr. 26, 2004.

(51) Int. Cl.
  *G05D 16/10* (2006.01)
  *F16K 31/122* (2006.01)

(52) U.S. Cl. ........ 137/15.18; 137/12; 137/505; 137/613

(58) Field of Classification Search .................. 137/613, 137/505.25, 505, 15.01, 15.18, 12
See application file for complete search history.

(56) References Cited

U.S. PATENT DOCUMENTS

| | | | | |
|---|---|---|---|---|
| 3,586,045 A | * | 6/1971 | Zimmer | 137/595 |
| 3,911,948 A | * | 10/1975 | Collins et al. | 137/505.42 |
| 6,116,242 A | * | 9/2000 | Frye et al. | 128/205.24 |
| 6,364,161 B1 | * | 4/2002 | Pryor | 222/3 |

* cited by examiner

*Primary Examiner* — Kevin Lee (57) ABSTRACT

A gas regulator includes a housing and a pressure regulator positioned within the housing along a first axis for controlling the pressure of gas received from a pressurized source. A flow meter controls the flow rate of the gas received from the pressure regulator. The flow meter is positioned relative to the housing along a second axis, transverse to the first axis. An outlet nozzle member has a nozzle stem and is positioned along the first axis. The outlet nozzle member receives the gas from the flow meter and delivers the gas through the nozzle stem.

20 Claims, 11 Drawing Sheets

GAS FLOW DEVICE

RELATED APPLICATIONS

This application is a continuation of U.S. application Ser. No. 11/074,295, filed Mar. 7, 2005 (now U.S. Pat. No. 7,578, 311), which claims the benefit of U.S. Provisional Application 60/565,657 filed Apr. 26, 2004. The entire teachings of the above applications are incorporated herein by reference.

BACKGROUND

Patients receiving oxygen for therapeutic purposes are typically fitted with an oxygen mask or cannula which receives the oxygen from a pressurized tank. Since the pressure of the oxygen within the tank can be at about 2200 psi, the pressure of the oxygen delivered to the patient is reduced to a low pressure, for example, about 22 psi, by a gas regulator. Some gas regulators have a pressure regulator for reducing the pressure of the oxygen as well as a flow meter for adjusting the flow rate of the gas. For certain applications, for example, patients who transport a portable oxygen tank with them as they conduct their daily activities, it is desirable for the size of the gas regulator to be minimized. However, some previous designs of gas regulators have been larger than preferred, or include parts that are complex and expensive to manufacture.

SUMMARY

Embodiments of the present invention provide a gas regulator that can be made with a simple design and be more compact and more economical than prior designs.

Particular embodiments include a gas regulator having a housing and a pressure regulator located within the housing for controlling pressure of gas received from a pressurized gas source. A flow meter can be secured to the housing for controlling flow rate of the gas received from the pressure regulator.

The flow meter can include a unitary outlet nozzle member having a bulkhead and a nozzle stem, which is positioned in the housing. Gas received from the pressure regulator passes through a bulkhead gas flow passage in the bulkhead. A flow regulating member can be positioned relative to the bulkhead and have a series of different sized orifices for selective alignment with the bulkhead gas flow passage to select a desired flow rate of gas. A flow body can be positioned relative to the flow regulating member, and with a flow body passage, direct the gas received from the flow regulating member into the nozzle stem to exit the flow meter.

In one embodiment, the unitary outlet nozzle member can have a generally disk-shaped bulkhead. The nozzle stem can be elongated, and extend from the bulkhead along a longitudinal axis and terminate in a nozzle outlet. The bulkhead can be positioned within a bore in the housing against a shoulder and sealed by a circumferential bulkhead sealing member. The bulkhead gas flow passage can extend through the bulkhead at a position laterally offset from the longitudinal axis and parallel to the axis. A lateral nozzle stem gas flow passage can extend laterally through the nozzle stem, and a longitudinal nozzle stem gas flow passage can extend within the nozzle stem along the longitudinal axis from the lateral nozzle stem gas flow passage to the nozzle outlet.

The flow regulating member can be rotatably mounted coaxially about the nozzle stem, and against the bulkhead of the nozzle member. The flow regulating member can have a generally annular disk-shaped flow regulating portion and a generally cylindrical bushing portion extending from the generally annular disk-shaped flow regulating portion. The generally annular disk-shaped flow regulating portion can provide selective rotatable alignment of the series of different sized orifices with the bulkhead gas flow passage to select a desired flow rate of gas. A lateral bushing portion gas flow passage can extend laterally through the bushing portion for communication with the lateral nozzle stem gas flow passage via an internal annular groove within the bushing portion. Nozzle stem sealing members can encircle the nozzle stem for sealing a gas flow path extending through the lateral bushing portion gas flow passage and the lateral nozzle stem gas flow passage.

The flow body can be annular in shape and mounted within the bore of the housing coaxially about the bushing portion of the flow regulating member. The flow body passage can extend through the flow body from the disk-shaped flow regulating portion of the flow regulating member at a location which is in alignment with the bulkhead gas flow passage and into communication with the lateral bushing portion gas flow passage via an internal annular groove within the flow body. The flow body passage can have an orifice seal, for sealing around the orifice that is positioned in line with the bulkhead gas flow passage. Bushing portion sealing members can encircle the bushing portion of the flow regulating member for sealing a gas flow path that extends through the flow body passage and the lateral bushing portion gas flow passage.

A retaining ring can be positioned within an internal annular groove in the bore of the housing for engaging the annular flow body to retain the annular flow body, the flow regulating member, and the nozzle member within the bore against the shoulder. A locking pin can engage both the housing and the flow body for preventing rotation of the flow body relative to the housing.

A generally cup-shaped annular knob can be positioned coaxially about and secured to the bushing portion of the flow regulating member. The knob can have an axial end wall with a central hole through which the nozzle extends, and a cylindrical side wall extending around a portion of the housing. Rotation of the knob causes rotation of the flow regulating member for selecting the desired flow rate of gas.

Another embodiment of the present invention includes a gas regulator having a housing and a pressure regulator located within the housing for controlling pressure of gas received from a pressurized gas source. The pressure regulator has an inlet nozzle through which the gas from the pressurized gas source flows. A piston having a longitudinal axis and upstream and downstream sides is biased by a spring system away from the inlet nozzle. The spring system can have a single helical spring positioned along the longitudinal axis of the piston which contacts the piston along a generally circular line of contact. The piston has a passage extending through the piston to allow gas from the inlet nozzle to pass therethrough, and a sealing surface on the upstream side in alignment with the inlet nozzle. Increasing pressure on the downstream side of the piston can cause the piston and the sealing surface to move towards the inlet nozzle to restrict flow through the inlet nozzle. Decreasing pressure on the downstream size of the piston can cause the spring system to move the piston and the sealing member away from the inlet nozzle to increase flow. A flow meter can be secured to the housing for controlling the rate of flow of the gas received from the pressure regulator.

The present invention also includes a flow meter which can have a bulkhead having a central axis and a female threaded flange for securing to an external thread on the housing. A bulkhead flow passage can extend through the bulkhead at a position offset from the central axis and parallel to the axis. A flow regulating member can be rotatably mounted against the bulkhead. The flow regulating member can be generally annular in shape and have a series of different sized orifices for selective rotatable alignment with the bulkhead gas flow passage to select a desired flow rate of gas. An outlet nozzle member can have a nozzle stem with an outlet and a male threaded portion for securing to the bulkhead within a female threaded hole in the bulkhead along the central axis. The nozzle member can have a shoulder for trapping the flow regulating member against the bulkhead. An annular knob can be rotatably mounted about the nozzle member and the bulkhead. A space between the knob member of the flow regulating member can form a chamber for receiving gas flowing through the bulkhead gas flow passage and the aligned orifice. The outlet of the nozzle stem can be in communication with the chamber. The knob member is rotationally secured to the flow regulating member whereby rotation of the knob causes rotation of the flow regulating member for selecting the desired flow rate of gas.

The present invention also includes a gas regulator having a housing and a pressure regulator positioned within the housing along a first axis for controlling pressure of gas received from a pressurized source. A flow meter for controlling flow rate of the gas received from the pressure regulator can be positioned relative to the housing along a second axis transverse to the first axis. An outlet nozzle member has a nozzle stem, and the outlet nozzle member can be positioned along the first axis. The outlet nozzle member receives the gas from the flow meter and delivers the gas through the nozzle stem.

In particular embodiments, the outlet nozzle can be positioned along the first axis for delivering the gas through the nozzle stem along the first axis. The flow meter can include a flow body mounted to the housing. A flow regulating member having a flow regulating portion can be rotatably positioned within the flow body about the second axis. The flow regulating portion has a series of different sized orifices for selecting a desired flow rate of gas. A knob is secured to the flow regulating member for causing rotation of the flow regulating portion for selecting the desire flow rate of gas.

The housing can have a generally cylindrical housing portion with an outer wall. The pressure regulator can be positioned within the generally cylindrical housing portion along the first axis. A portion of the outer wall of the generally cylindrical housing portion can have a flattened surface to which the flow body of the flow meter is mounted. The generally cylindrical housing portion can also have first and second housing passages extending through the flattened surface of the outer wall to provide gas flow to and from the flow meter. The first housing passage can include a recessed region formed in the flattened surface extending through a partial thickness of the outer wall and an opening extending from the recessed region through a remaining thickness of the outer wall for communication with the pressure regulator. The recessed region extends beyond the periphery of the flow regulating portion, for providing gas flow around the flow regulating portion. A sealing arrangement can surround the second housing passage for sealing between the flow regulating portion of the flow regulating member and the second housing passage for providing a sealed path through a selected orifice of the flow regulating portion aligned with the second housing passage.

The flow body can have a cavity in which the flow regulating portion is positioned. The cavity can be sized and configured such that gas can flow out of the housing from the recessed region and into the cavity of the flow body past the flow regulating portion for passage back into the housing through the selected orifice aligned with the second housing passage.

The outlet nozzle member can be secured within the generally cylindrical housing portion and include an outlet passage with a lateral portion that is in communication with the second housing passage and a longitudinal portion extending from the lateral portion along the first axis. The outlet nozzle member can be a unitary member having a bulkhead with the nozzle stem extending from the bulkhead.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
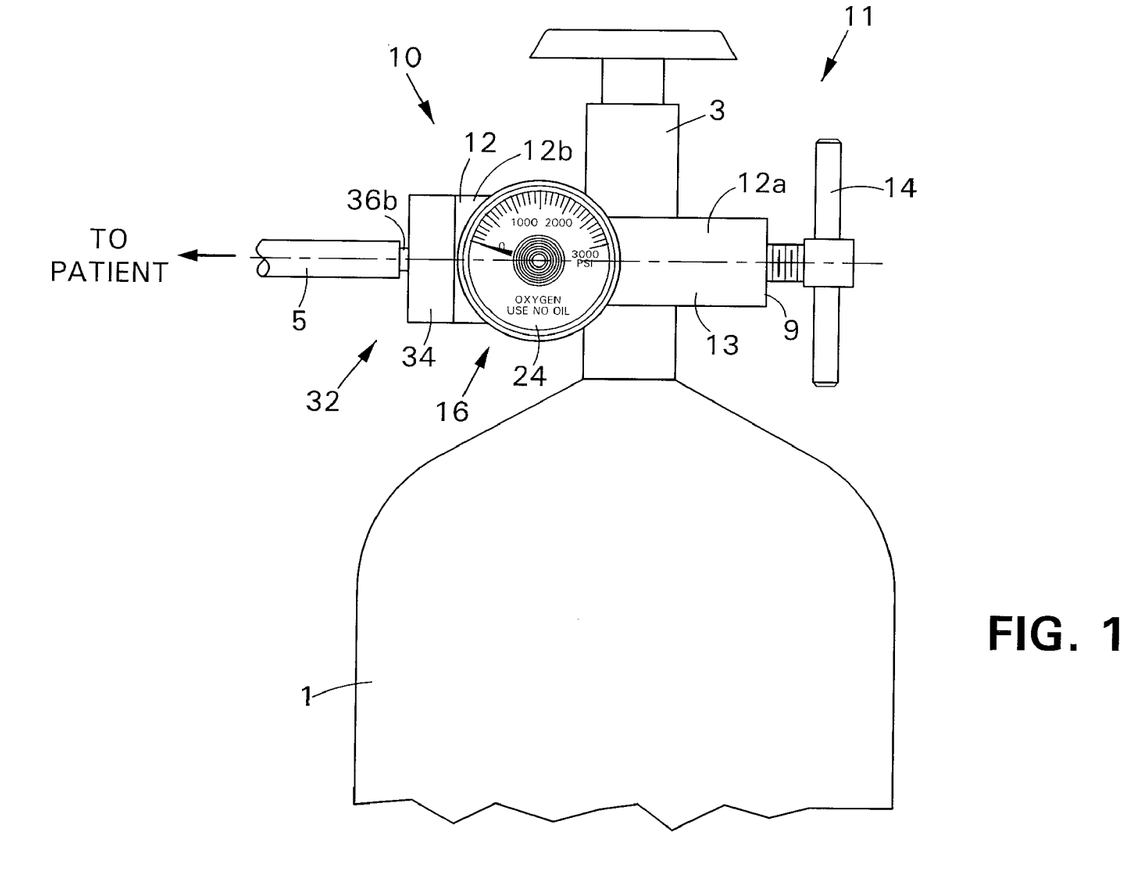
FIG. 1 is a front view of a particular embodiment of a gas regulator secured to a tank of pressurized gas.
Figure 2:
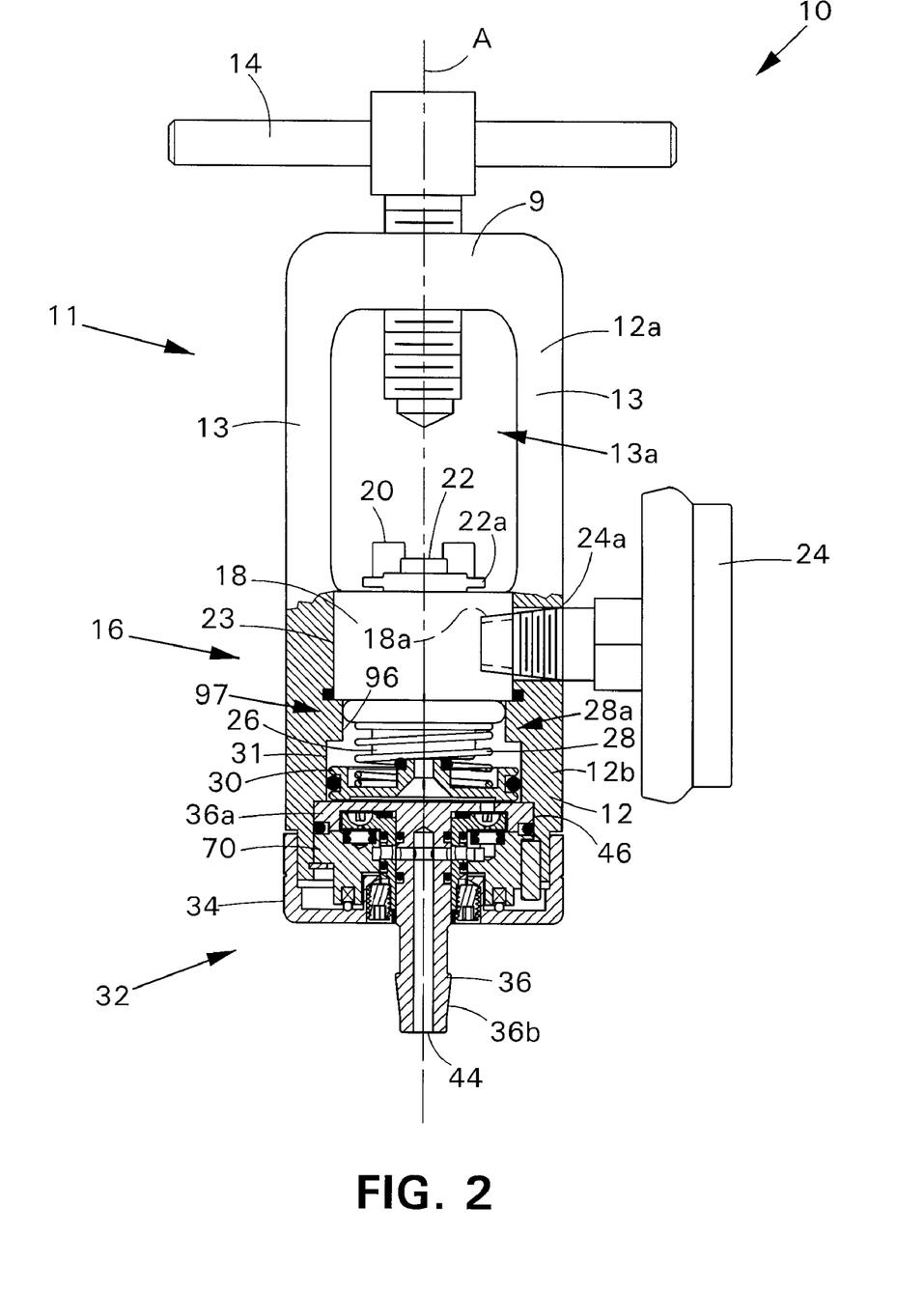
FIG. 2 is a side view of the gas regulator of FIG. 1 with a portion shown in section.

Referring to FIGS. 1 and 2, a gas regulator 10 regulates gases, for example, by regulating the flow of oxygen from a pressurized source and delivering the regulated oxygen to a patient via tubing 5 for therapeutic purposes. The regulator 10 includes a housing 12 containing an attachment device 11 for securing the gas regulator 10 to a source of pressurized gas, such as a tank 1, a pressure regulator 16 for reducing or controlling the pressure of the gas that is delivered, and a flow meter 32 for controlling the flow rate of the delivered gas. Embodiments of regulator 10 are commercially available from Inovo, Inc. located in Naples, Fla., under part numbers 4508L and 4515L.

Referring to FIG. 2, the housing 12 has a yoke portion 12a and a generally cylindrical body portion 12b extending along a longitudinal or central axis A. The yoke portion 12a of the housing 12 forms part of the attachment device 11. The yoke portion 12a has two spaced apart arms 13 with a space 13a in between. The outlet stem 3 of the tank 1 (FIG. 1) fits within the space 13a and is clamped against the inlet 22 to the gas regulator 10 by a clamping tee screw 14 that is threaded through a cross piece 9. Two alignment pins 20 can ensure that the outlet stem 3 of the tank 1 is properly aligned with the inlet 22 for receiving gas from tank 1. The pressure within tank 1 can be about 2200 psi when containing oxygen.

Figure 3:
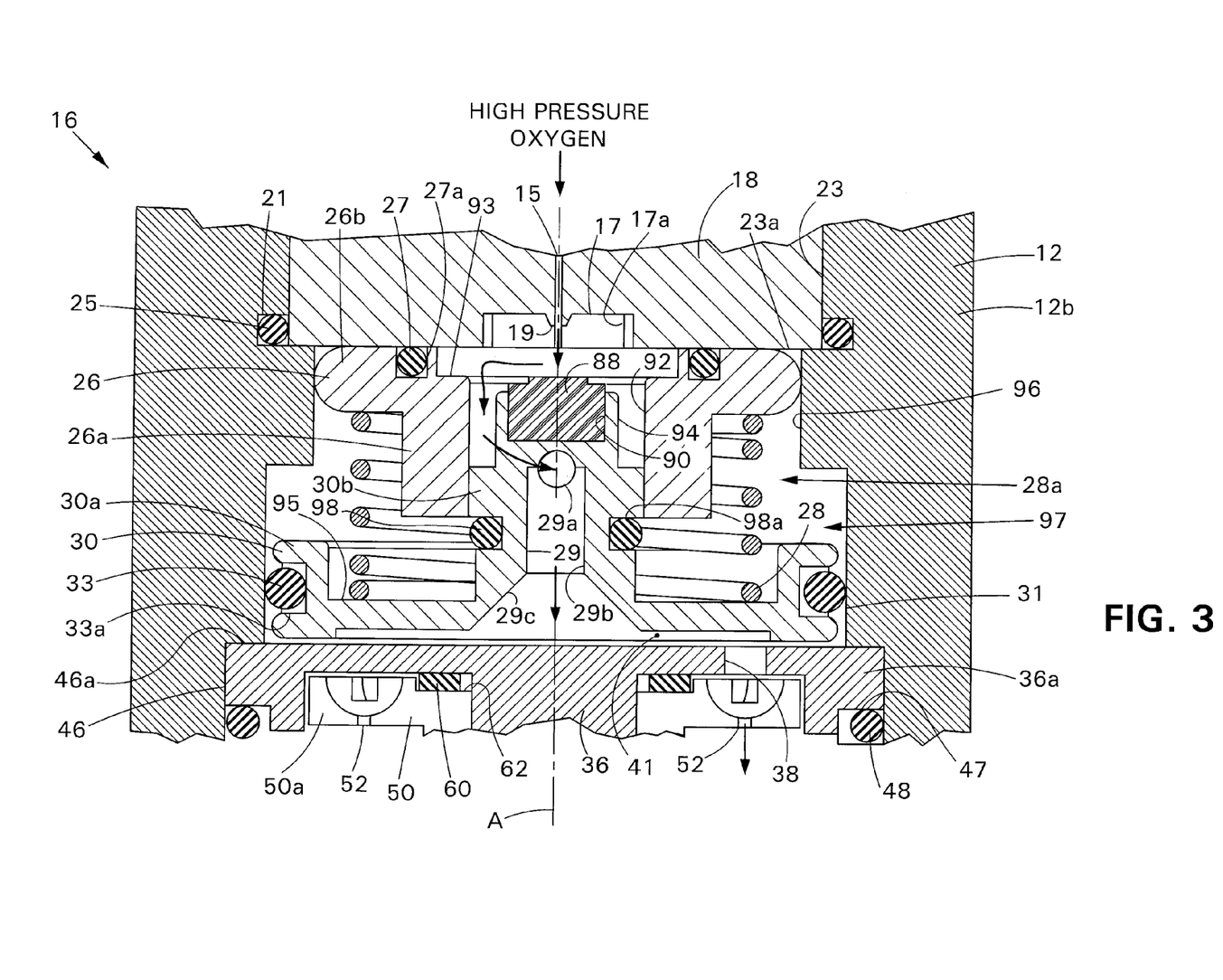
FIG. 3 is an enlarged sectional view showing the pressure regulator portion of the gas regulator shown in FIG. 2.

Referring to FIGS. 2 and 3, the pressure regulator 16 includes the inlet 22 which extends into a generally cylindrical core member 18. The core member 18 is positioned within a bore 23 in the body portion 12b of the housing 12 along longitudinal axis A. A pressure gauge 24 in communication with the inlet 22 indicates the pressure of the incoming gas. The inlet 22 is in communication with an inlet nozzle 19 on the downstream side of the core member 18 via a passage 15, which passes through the core member 18. The inlet nozzle 19 is positioned within a recess 17 in the core member 18.

A piston assembly 97 is positioned adjacent to the core member 18. The piston assembly 97 has a piston 30 aligned with the inlet nozzle 19 along longitudinal axis A. The piston 30 has a sealing surface or member 88 for controlling flow through the inlet nozzle 19, and a passage 29 extending through the piston 30 to allow gas from the inlet nozzle 19 to pass through the passage 29.

The piston 30 and the sealing member 88 are biased away from the inlet nozzle 19 against a bulkhead 36a of a unitary outlet nozzle member 36 of the flow meter 32 by a spring system 28a having a helical compression spring 28. Gas exiting the inlet nozzle 19 passes through the piston 30 via a passage 29 and enters the flow meter 32 through a passage 38 in the bulkhead 36a.

If the pressure of the gas on the downstream side of the piston 30 exerts a force on the piston 30 that exceeds the biasing force exerted by the spring 28 of the spring system 28a on the piston 30 and friction forces of the piston 30, the downstream gas pressure forces the piston 30 and the sealing member 88 towards the inlet nozzle 19. As the sealing member 88 extends into the recess 17 in the core member 18, flow from the inlet nozzle 19 decreases or becomes restricted, decreasing the gas pressure on the downstream side of the piston 30 that is delivered to the flow meter 32. However, if the pressure of the gas on the downstream side of the piston 30 exerts a force on the piston 30 that is less than the biasing force exerted by the spring 28 of the spring system 28a, the spring 28 biases the sealing member 88 and the piston 30 away from the nozzle 19 to increase gas flow and the gas pressure that is delivered to the flow meter 32. Typically, the piston 30 and the sealing member 88 reach a position of equilibrium relative to the nozzle 19 to provide a flow of gas to the flow meter 32 through the passage 38 in the bulkhead 36a that is at a constant reduced operating pressure, for example, about 22 psi. The actual operating pressure, however, is a design choice and can be varied from 22 psi.

Figure 4:
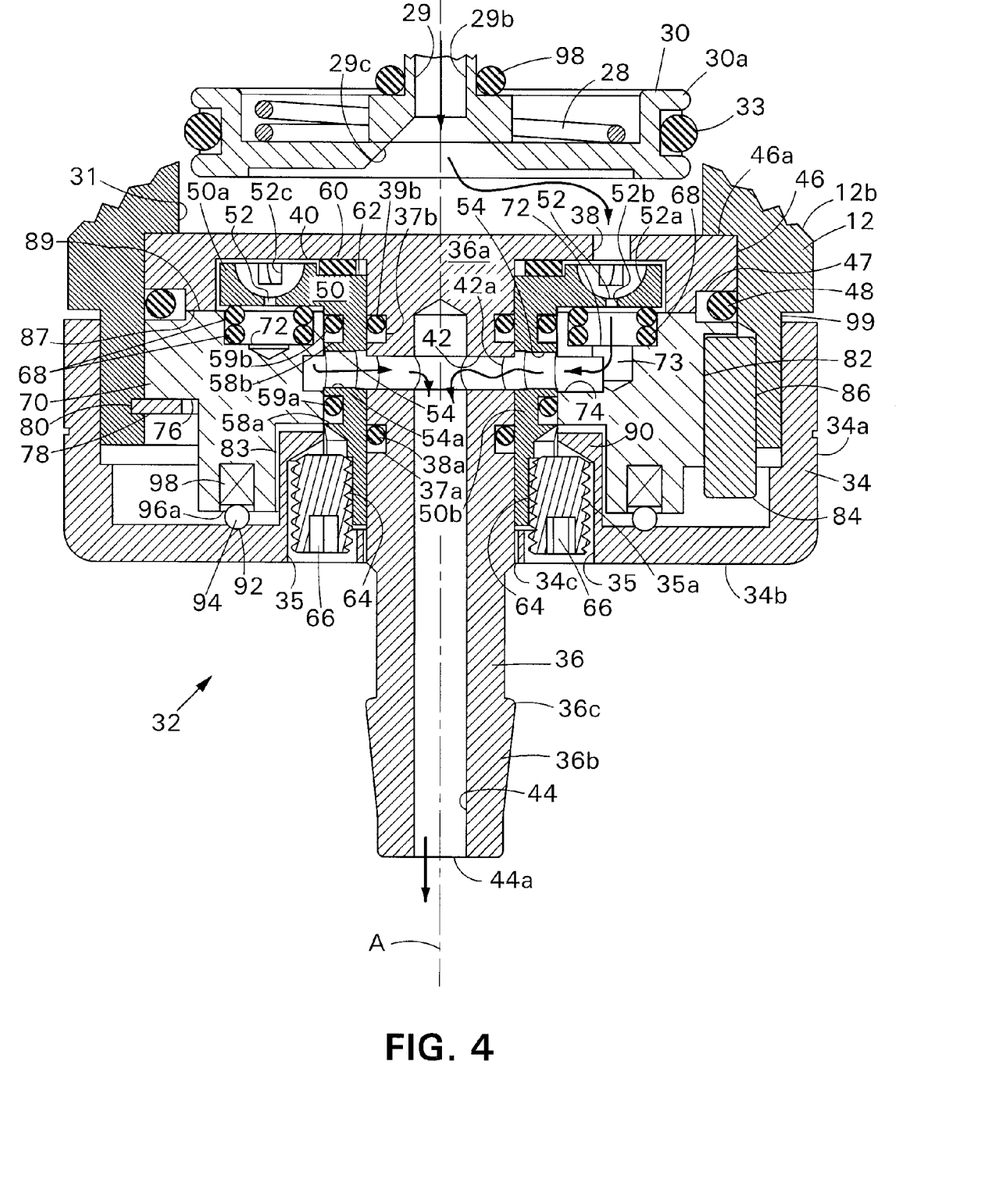
FIG. 4 is an enlarged sectional view showing the flow meter portion of the gas regulator shown in FIG. 2.

Referring to FIGS. 2 and 4, the flow meter 32 includes the bulkhead 36a of the unitary outlet nozzle member 36 which is positioned within a bore 46 in the body portion 12b of housing 12 along longitudinal axis A. The bulkhead 36a receives the gas flow from the pressure regulator 16 and piston 30 through the passage 38 in the bulkhead 36a. As shown, the bulkhead 36a is generally disk shaped but other profiles can be used without affecting the operation of the regulator.

The unitary outlet nozzle member 36 has an elongate nozzle stem 36b extending from the bulkhead 36a along the longitudinal axis A and terminates in a nozzle outlet 44a for attachment to tubing 5 (FIG. 1). The nozzle stem 36b has a lateral nozzle stem gas flow passage 42 in communication with a longitudinal nozzle stem gas flow passage 44 which extends along the longitudinal axis A from the lateral nozzle stem gas flow passage 42 to the nozzle outlet 44a. The passage 42 can include an external groove 42a which can be circular.

A flow regulating member 50 having a flow regulating portion 50a and a bushing portion 50b can be rotatably mounted coaxially about the nozzle stem 36b and about axis A. The flow regulating portion 50a can have a generally annular disk-shape and the bushing portion 50b can be generally cylindrical. The flow regulating portion 50a can be positioned within a recess 40 within the downstream side of the bulkhead 36a and have a series of different sized orifices 52 for providing different flow rates positioned at intervals for selective rotatable alignment with the passage 38 through the bulkhead 36a. The recess 40 can be annular in shape. The flow rate of flow meter 32 can be selected by aligning the desired orifice 52 with passage 38. A lateral bushing portion gas flow passage 54 extends laterally through the bushing portion 50b in communication with the lateral nozzle stem gas flow passage 42. The passage 54 can include an internal groove 54a, which can be annular.

The flow regulating portion 50a can be held or trapped against the bulkhead 36a by a stationary flow body 70 that is mounted within bore 46 about the bushing portion 50b of the flow regulating member 50 and about axis A. The flow body 70 can be annular and mounted coaxially about the bushing portion 50b. The flow body 70 has a passage 73 which is aligned with the bulkhead passage 38 and the associated orifice 52 for communication with the lateral bushing portion gas flow passage 54. The passage 73 can include an internal groove 74 which can be annular. The flow body 70 can be held in place within the bore 46 of body portion 12b by a retaining ring 78 which engages a groove 80 within bore 46, which can be annular. Rotation of the flow body 70 within bore 46 can be prevented by a locking pin 84.

A knob 34 for rotating the flow regulating member 50 can be positioned about the bushing portion 50b of the flow regulating member 50 and about axis A. The knob 34 can be secured to the bushing portion 50b by set screws 66 and can have a generally annular cup shape for positioning coaxially about the bushing portion 50b. A central opening 34c through the axial end wall 34b of knob 34 allows the nozzle stem 36b to extend through the knob 34. The knob 34 can be made with a cylindrical side wall 34a which extends around a portion of the body portion 12b of the housing 12 at the end thereof and within an annular neck 99. Spring loaded balls 94 can engage detents 92 within the knob 34 for providing proper alignment of the desired orifices 52 and flow rates with the passage 38 in the bulkhead 38.

The side wall 34a of knob 34 can include a series of numbers marked on the circumference or periphery which designate the flow rates provided by corresponding orifices 52 of the flow regulating member 50. By rotating knob 34 and aligning the desired number on the knob 34 with a marking on the body portion 12b of the housing 12, such as an arrow or a line, the desired orifice 52 and flow rate can be selected. Consequently, when delivering oxygen to a patient, oxygen from tank 1 that has been reduced in pressure by pressure regulator 16, for example, from about 2200 psi to about 22 psi, enters the flow meter 32 through the passage 38 in bulkhead 36a and through the selected orifice 52 that is aligned with the passage 38 for restricting the flow rate of the gas to the desired value. The restricted flow of oxygen through orifice 52 exits the flow meter 32 and gas regulator 10 through the passage 73 in the flow body 70, the lateral bushing portion gas flow passage 54 in the bushing portion 50b of the flow regulating member 50, and the lateral nozzle stem gas flow passage 42, the longitudinal nozzle stem gas flow passage 44 and the nozzle outlet 44a of nozzle stem 36b. Tubing 5 (FIG. 1) then delivers the selected flow of oxygen to the patient.

A more detailed description of embodiments of the gas regulator 10 depicted in FIGS. 1-4 now follows. The housing 12 can be made of anodized aluminum and in one embodiment, can be about 3¼ inches long with a body portion 12b having a diameter of about 1⅜ inches which provides a small compact gas regulator 10. The cross piece 9 of the yoke portion 12a of housing 12 can have a brass threaded insert fitted therein through which the clamping tee screw 14 passes. The alignment pins 20 can be pressed into the outer periphery of the body portion 12b of housing 12.

The core member 18 can be made of brass and can be positioned against a shoulder 23a within the bore 23 (FIG. 3) of body portion 12b of housing 12. The core member 18 can be sealed in the bore 23 by a seal member 25 such as an O-ring positioned within a groove 21, which can be annular. The core member 18 can be locked in place by set screws. The inlet 22 protrudes from the core member 18 and can include a filter (FIG. 2). A seal 22a such as a seal washer is fitted around the neck of the protruding inlet 22 for sealing against the outlet stem 3 of tank 1. The pressure gauge 24 extends through an opening 24a in the body portion 12b of the housing 12 and into a threaded hole 18a in the core member 18 that is in communication with passage 15 and inlet 22. The opening 24a in the body portion 12b of the housing 12 can be positioned and sized such that when the threaded stem of the pressure gauge 24 is secured to the core member 18, the pressure gauge 24 can aid in the rotational and/or longitudinal locking of the core member 18 within the housing 12. In this manner, a fitting protrusion is laterally extended through the housing 12 for engagement with an inner element to secure or interlock the inner element within the housing 12. In some embodiments, the core member 18 can have threads which engage mating threads within the housing 12. Additionally, other methods and fittings can be used for locking purposes, such as described in U.S. application Ser. No. 10/715,304, filed Nov. 17, 2003, the teachings of which are all incorporated herein by reference in their entirety. The recess 17 at the downstream side of core member 18 can be generally circular and sized to accept the tip 94 of the piston stem 30b of piston 30. Two sides of the recess 17 can have widened portions 17a which allow gas to escape when the tip 94 is partially within recess 17 but where the sealing member 88 is not fully engaged with the inlet nozzle 19.

The piston 30 can be made of brass and can be part of a piston assembly 97 which includes the spring system 28a with spring 28, and a spring bushing 26. The spring bushing 26 can also be made of brass and can have a sealing portion 26b and a stem 26a with a bore 92 extending through the spring bushing 26. The sealing portion 26b can be generally annular disk-shaped and the stem portion 26a can be generally cylindrical. The sealing portion 26b can be positioned within a bore 96 within the body portion 12b of housing 12 and in alignment with axis A against a flat surface on the downstream side of the core member 18. A seal 27 within a groove 27a in the upstream side of the sealing portion 26b can seal the sealing portion 26b against the core member 18 and around the inlet nozzle 19 and the recess 17. In addition, a recess 93 can be included in the upstream side of the sealing portion 26b to face and be in communication with the recess 17 in the core member 18.

The upstream end of the spring 28 can be positioned around the stem 26a of spring bushing 26 and against the downstream side of the sealing portion 26b. By positioning the spring bushing 26 between the core member 18 and the spring 28, the spring 28 can be prevented from grinding against the core member 18. The downstream end of the spring 28 can be positioned against the wide portion 30a of piston 30, and can be within a recess 95 in portion 30a, and coaxially around piston stem 30b and axis A. This biases the piston 30 away from the spring bushing 26 and inlet nozzle 19 with an axial force that is centered about axis A and in a compact manner.

The piston stem 30b slides within the bore 92 of spring bushing 26 for engaging the nozzle 19. A seal 98, such as an O-ring, can be positioned within an external groove 98a around the piston stem 30b for sealing between the piston stem 30b and the bore 92. The groove 98a can be annular. The tip 94 of piston stem 30b can have an axial bore or recess 90 in which the sealing member 88 is fitted. Typically the sealing member 88 is made of a relatively firm polymeric material such as polytetrafluoroethylene (PTFE), but alternatively can be formed of other suitable materials such as nylon or Delrin®. The tip 94 can have a narrowed portion relative to the rest of the piston stem 30b to allow gas flowing from inlet nozzle 19 into the recess 93 and the bore 92 of the spring bushing 26 to enter the passage 29 through piston 30 via lateral passage portion 29a, which can be located at least partially on the narrowed portion of tip 94. The lateral passage portion 29a connects with a longitudinal passage portion 29b extending along axis A which opens into a flared portion 29c at the downstream end of piston 30. The flared portion 29c extends into a shallow recess 91 on the downstream side of piston 30. The recess 91 can extend as far as the passage 38 in the bulkhead 36a so that gas passing through the passage 29 in piston 30 can reach the passage 38 even when the piston 30 is biased by the spring 28 against the bulkhead 36a. The wide portion 30a of piston 30 is positioned within a bore 31 in the body portion 12b of housing 12. A seal 33, such as an O-ring, within an external groove 33a on the periphery of the disk-shaped portion 30a can provide sealing between the piston 30 and the bore 31.

Embodiments of the piston assembly 97 with seals 27, 98 and 33, can keep the spring 28 of the spring system 28a outside of the gas flow path of pressure regulator 16 so that particles generated by the spring 28 against the spring bushing 26 and the piston 30 are prevented from entering the gas flow. The spring bushing 26 allows gas to flow from the nozzle 19 into the passage 29 through the piston 30 while isolating the spring 28 from this gas flow. The spring bushing 26 can have a relatively simple design which can in turn, allow the core member 18 to have a simple design, for example, being generally cylindrical. By having relatively simple parts, the pressure regulator 16 can be made compact and economically.

In one embodiment, the spring 28 of the spring system 28a can be a helical compression spring made of music wire having an outer diameter of about 0.660 inches, a free length of about 0.625 inches and a spring constant of about 36 lbs./in., with ground ends, so that the spring 28 can press against the spring bushing 26 and the piston 30 along generally circular continuous lines of contact. The generally circular lines of contact can distribute forces evenly over an extended area so that grinding forces of the spring 28 against the spring bushing 26 and the piston can be minimized for minimizing the generation of particles. Alternatively, the spring system can employ other springs, for example, a flat wire crest to crest spring, or a wave washer, both of which typically provide intermittent points of contact. In addition, the spring system can have a series of helical compression springs positioned offset from and surrounding the axis A for providing intermittent points of contact.

Referring to FIG. 4, the unitary outlet nozzle member 36 can be made of anodized aluminum. The bulkhead 36a of nozzle member 36 can be sealed within the bore 46 of the body portion 12b of housing 12 against shoulder 46a with a seal 48, such as an O-ring. The seal 48 can be positioned on a shoulder 47 located on the downstream side of the bulkhead 36a. Seals 39a and 39b, such as O-rings, can be positioned within respective external grooves 37a and 37b located on opposite axial sides of the external groove 42a and the lateral nozzle stem gas flow passage 42. The grooves 37a and 37b can be annular. The seals 39a and 39b are between the bushing portion 50b of the flow regulating member 50 and the nozzle stem 36b to seal a gas flow passage through the lateral bushing portion gas flow passage 54 and the lateral nozzle stem gas flow passage 42. In the embodiment shown, the lateral nozzle stem gas flow passage 42 extends laterally clear through the nozzle stem 36b to provide two flow paths to the longitudinal nozzle stem gas flow passage 44, but alternatively, can extend into the nozzle stem 36b only on one side. The nozzle stem 36b can have a slightly tapered tip 36c (FIG. 4) with a ridge for the engagement and retention of tubing 5 (FIG. 1) on the nozzle stem 36b. Providing the nozzle member 36 with a bulkhead 36a and a nozzle stem 36b that is in a simple one piece design and which is mounted within the bore 46 in the housing 12, can contribute to minimizing the size, complexity and manufacturing costs of gas regulator 10.

A spacer 60 can be positioned within a recess 62 on the upstream side of the flow regulating portion 50a of the flow regulating member 50 for acting as a bearing surface and slightly spacing the flow regulating portion 50a from the mating surface of the recess 40 in the bulkhead 36a. This allows smooth rotation of the flow regulating member 50 and minimizes or prevents the production of metal particles in the gas flow that can be caused by the flow regulating member 50 rubbing against the bulkhead 36a. The spacer 60 can be annular in shape and can be formed of a relatively firm polymeric material such as polytetrafluoroethylene (PTFE), but alternatively, can be made of other suitable materials such as nylon, Delrin®, or can be an O-ring. The recess 62 can be an annular bore.

The flow regulating member 50 can be formed of brass and, in one embodiment, has eleven orifices 52 with different sized orifice openings 52b that are arranged at intervals around the flow regulating portion 50a to provide selectable flow rates of 0.5, 1, 1.5, 2, 2.5, 3, 4, 5, 6, 7 and 8 liters per minute (LPM). One position on the flow regulating portion 50a can be made without orifice 52 so that flow through the passage 38 can be blocked when gas regulator 10 is not in use. The orifices 52 can include upstream spherical entrances 52a of uniform size for aligning with the passage 38 in the bulkhead 36a. An upstream groove 52c can extend on the upstream side of the flow regulating portion 50a to connect the spherical entrances 52a of the orifices 52 together. Gas passing through passage 38 in bulkhead 36a can occupy the groove 52c so that axial loading of the flow regulating member 50 by gas pressure is evenly directed along the axis A. This provides even loading of the components in flow meter 32 thereby promoting smooth rotation of the flow regulating member 50. The groove 52c can be annular.

Seals 59a and 59b, such as O-rings, can be positioned within respective external grooves 58a and 58b located on opposite axial sides of the lateral bushing portion gas flow passage 54 of the bushing portion 50b of the flow regulating member 50. The grooves 58a and 58b can be annular. The seals 59a and 59b are between the bushing portion 50b and the flow body 70 for sealing a gas flow passage through the passage 73 of the flow body 70, and the lateral bushing portion gas flow passage 54 of the flow regulating member 50. In the embodiment shown, the lateral bushing portion gas flow passage 54 extends laterally clear through the bushing portion 50b to provide two flow paths from the internal annular groove 74 of the flow body 70, but alternatively, can extend into the bushing portion 50b only on one side.

The downstream end of bushing portion 50b of the flow regulating member 50 can include two threaded indentations, or half threads, 64 on opposite sides of the periphery which extend in the axial direction for engaging one half of the set screws 66 to lock the knob 34 to the flow regulating member 50. The other half of the set screws 66 can engage half threaded hole portions 35a in the collar 90 of knob 34. Using half threads 64 instead of full threaded holes can allow the diameter of the flow regulating member 50 to be made smaller, thereby allowing the gas regulator 10 to be more compact.

The flow body 70 can be made generally circular in shape and can be made of anodized aluminum. The passage 73 entering flow body 70 has an entrance bore 72 for axial alignment with an orifice 52 and passage 38. The entrance bore 72 can have a sealing arrangement, such as two O-rings 68, to seal around the orifice 52 that is aligned with the passage 38 through the bulkhead 36a to seal between the flow regulating portion 50a and the flow body 70 such that the gas flow path through orifice 52 and passage 73 is sealed. A second bore 72 not connected to the passage 73 but having the same sealing arrangement, such as O-rings 68, can be positioned on the opposite side of axis A in flow body 70 for contacting the flow regulating portion 50a on that side so that the flow body 70 presses against the flow regulating portion 50a equally on opposite sides of axis A. The flow regulating portion 50a can be slightly recessed within the recess 40 of bulkhead 36a so that the seals 68 of the flow body 70 press against the flow regulating portion 50a while the upstream surface 87 of flow body 70 rests against a ridge 89 of bulkhead 36a.

Rotation of the flow body 70 within the body portion 12b of housing 12 can be prevented by a locking pin 84. One half of the locking pin 84 can be positioned in a groove 82 on the side of the flow body 70 and the other half can be positioned in a groove 86 on the internal surface of bore 46 in the body portion 12b. The downstream surface of flow body 70 can have two holes 96a which house compression springs 98 for spring loading the balls 94 against the detents 92 in the inner surface of the axial end wall 34b of knob 34. A recess 83 can be made in the downstream side of the flow body 70 to allow the inner collar 90 of knob 34 to extend and rotate in the recess 83 which helps minimize the length of the gas regulator 10.

The knob 34 can be made of anodized aluminum. The set screws 66 can extend through the axial end 34b of knob 34 through threaded holes 35. The threaded holes 35 can begin as full threaded holes and continue with half threaded holes portions 35a when entering the collar 90 of knob 34. The half threaded holes 64 of bushing portion 50b and the half threaded hole portions 35a of collar 90 together can form a full threaded hole for locking the knob 34 to the bushing portion 50a.

Figure 5:
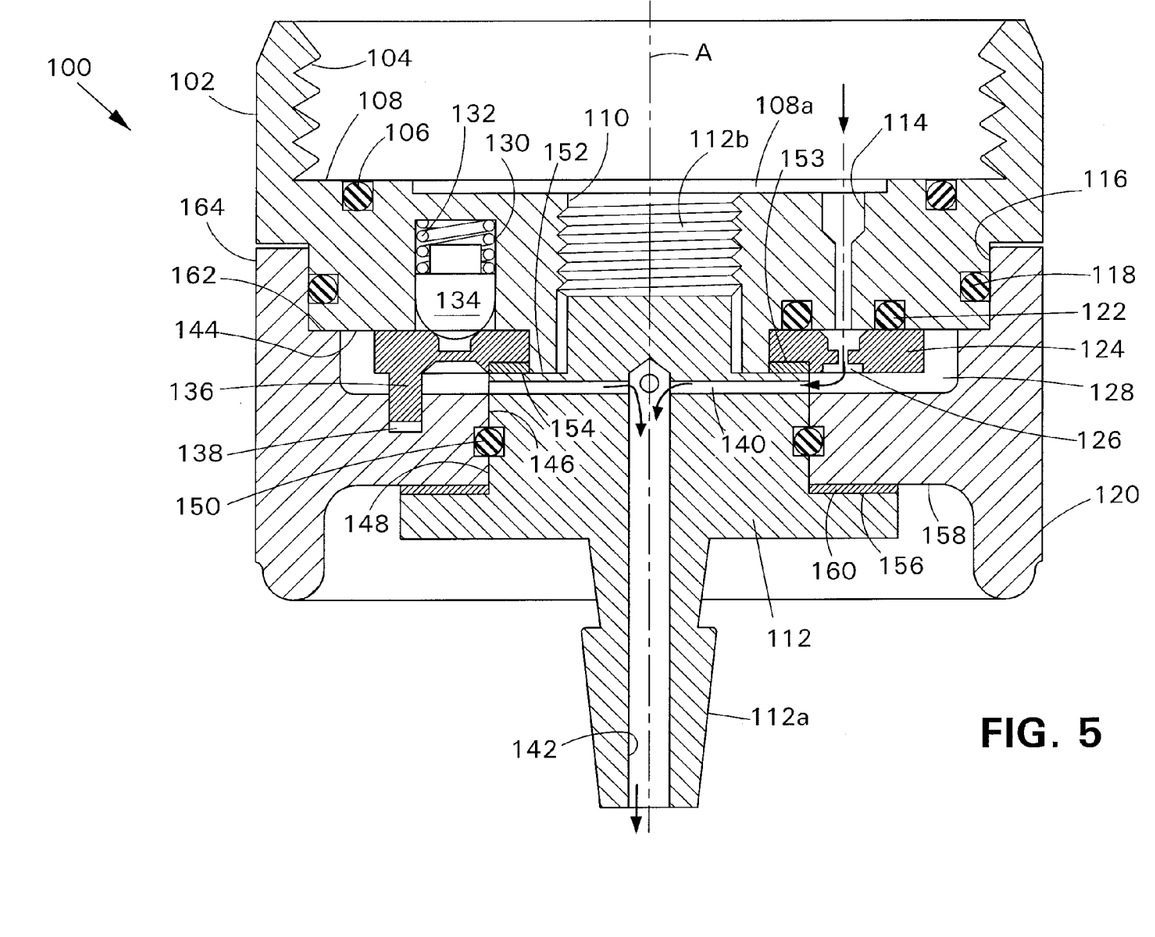
FIG. 5 is a sectional view of another embodiment of a flow meter portion.

Referring to FIG. 5, a flow meter 100 can be substituted for the flow meter 32 on gas regulator 10. The flow meter 100 can include a bulkhead member 102 having a female threaded flange 104 for securing to an external thread on the housing 12. The bulkhead member 102 has a bulkhead portion 108 which can be sealed to the housing 12 with an O-ring seal 106. A bulkhead recess 108a can be included in the bulkhead portion 108. A bulkhead flow passage 114 can extend through the bulkhead portion 108 at a position offset from the longitudinal or central axis A. A flow regulating member 124 can be rotatably mounted against the downstream surface 144 of the bulkhead portion 108. The flow regulating member 124 can be generally annular in shape and have a series of different sized orifices 126 for selective rotatable alignment with the bulkhead gas flow passage 114 to select a desired flow rate of gas. An O-ring seal 122 can provide sealing between the bulkhead gas flow passage 114 and the selected orifice 126. A rounded protrusion 134 can be positioned within a hole 130 in the bulkhead portion 108 and biased by a spring 132 to engage orifices 126 on the opposite side of axis A to help align the selected orifice 126 with the bulkhead gas flow passage 114.

An outlet nozzle member 112 with a nozzle stem 112a can have a male threaded portion 112b which provides securement to the bulkhead portion 108 by engagement with a threaded hole 110 in the bulkhead portion 108. The nozzle member 112 can have a first shoulder 154 which is tightened against an annular ridge 152 of the bulkhead 108. A portion of the shoulder 154 can extend over the flow regulating member 124 to trap the flow regulating member 124 against the downstream side of the bulkhead portion 108 with an annular spacer 153 being positioned between the shoulder 154 and the flow regulating member 124. The nozzle member 112 can have a second shoulder 156 which engages the downstream surface 158 of an annular knob 120. The knob 120 can be rotatably mounted about the nozzle member 112 and the bulkhead member 102. An annular washer 160 can be positioned between the shoulder 156 and the surface 158 to promote smooth rotation of the knob 120. The flow regulating member 124 can be rotationally connected or fixed to the knob 120 by a protrusion 136 extending from the flow regulating member 124 into a recess 138 in the knob 120. The upstream side of knob 120 can have a shoulder 162 which is positioned against surface 144 of bulkhead portion 108 and an annular flange 164 which engages neck 116. Sealing between the flange 164 and neck 116 can be provided by an O-ring 118. The knob 120 can have a central opening 146 which engages the diameter 148 of the nozzle member 112 with an O-ring 150 providing sealing therebetween.

In use, gas from pressure regulator 16 flows through the passage 114 in the bulkhead portion 108. The selected orifice 126 in alignment with passage 114 restricts the flow of gas to the desired flow rate. The restricted gas enters a cavity 128 between the flow regulating member 124 and the knob 120. The gas then exits the flow meter 100 via a lateral nozzle member passage 140 and then a longitudinal nozzle member passage 142.

Figure 6:
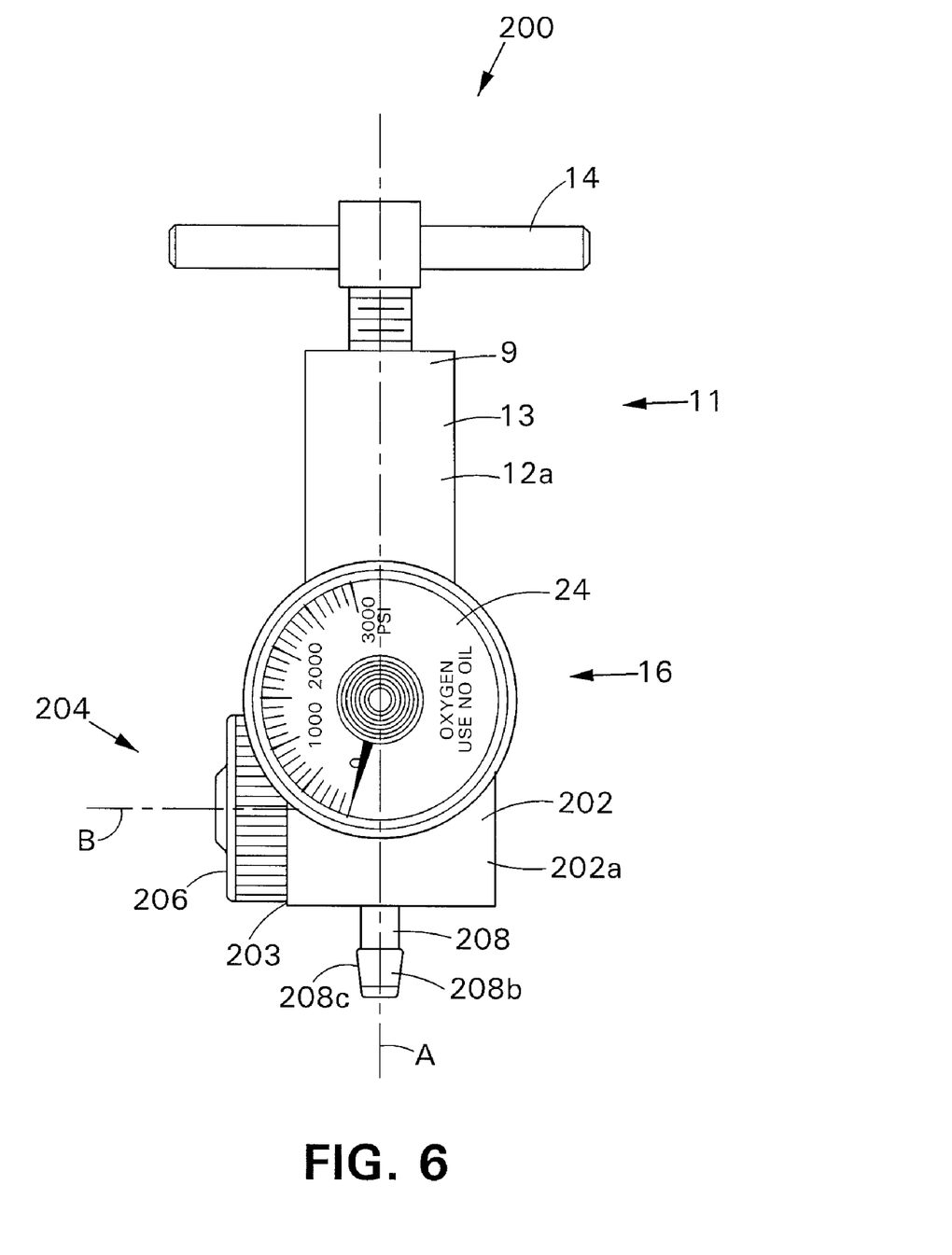
FIG. 6 is a front view of another embodiment of a gas regulator.
Figure 7:
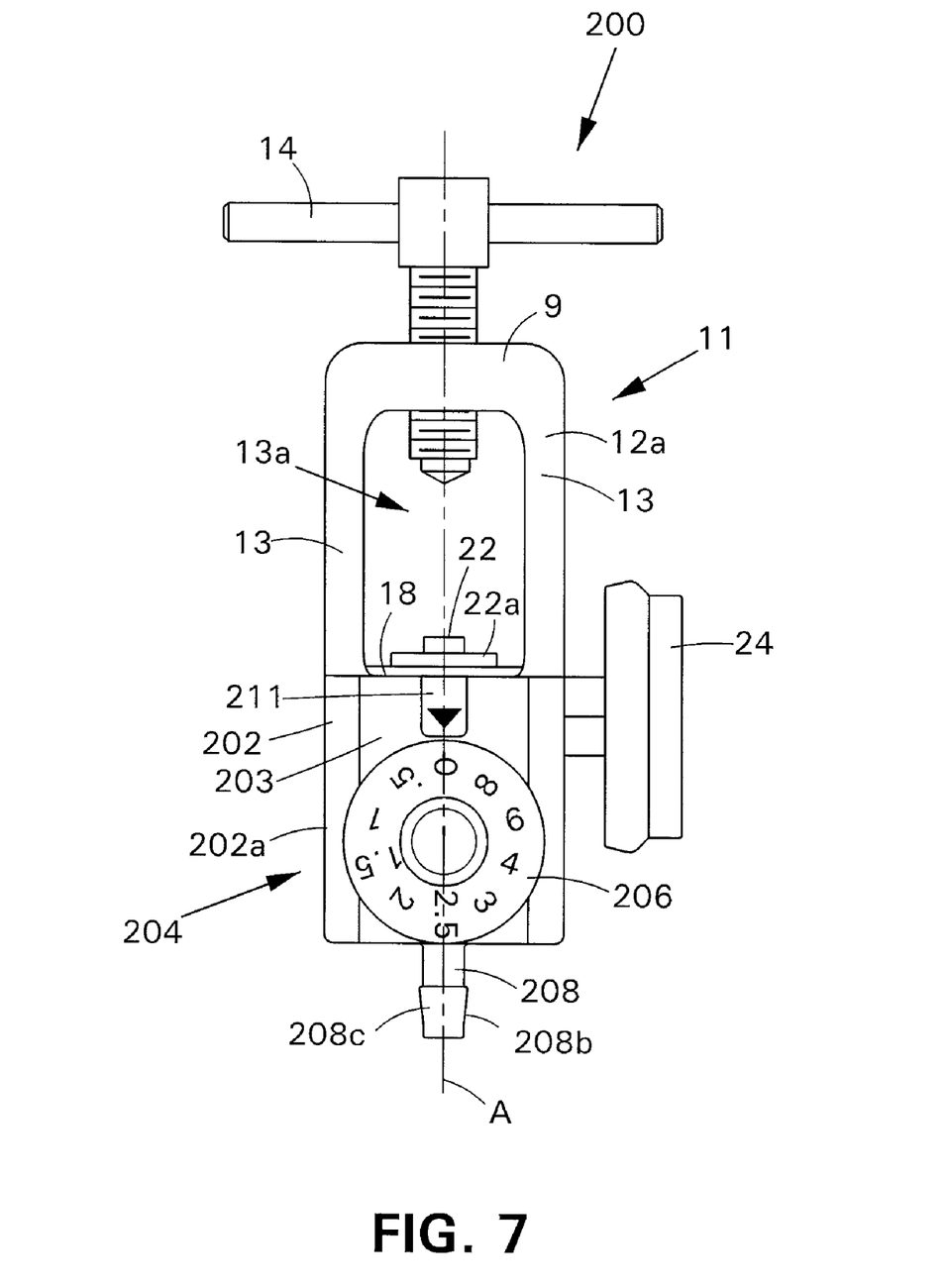
FIG. 7 is a side view of the gas regulator of FIG. 6.
Figure 8:
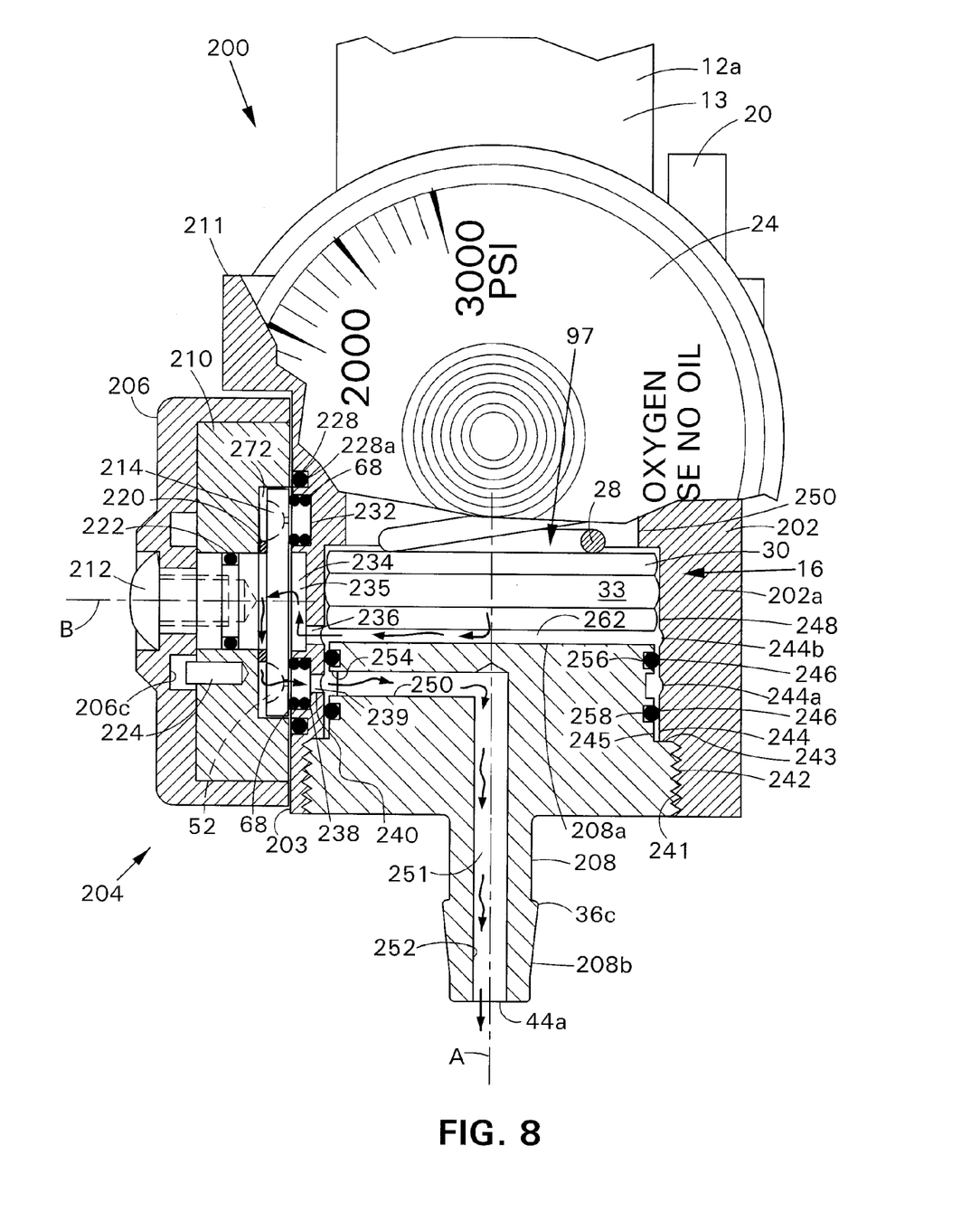
FIG. 8 is an enlarged side view of part of the regulator of FIG. 6 with a portion shown in section.

Referring to FIGS. 6-8, gas regulator 200 is another embodiment of a gas regulator which generally differs from gas regulator 10 in that the flow meter 204 is laterally mounted along a transverse or lateral axis B, instead of along the longitudinal axis A. The attachment device 11 and pressure regulator 16 can be similar to that in gas regulator 10. Gas regulator 200 includes a housing 202 having a generally cylindrical portion 202a in which the piston assembly 97 of the pressure regulator 16 is positioned along the longitudinal axis A within a bore or internal diameter 244 and a bore 250 (FIG. 8). An outlet nozzle member 208 is positioned along the longitudinal axis A within the bore 244 in the housing 202 and has a bulkhead 208a which seals the downstream or longitudinal end of the bore to define a piston chamber 248. The outlet nozzle member 208 also has an elongate nozzle stem 208b for delivering gas received from the laterally positioned flow meter 204 along the longitudinal axis A.

The flow meter 204 can be laterally mounted to the side of the generally cylindrical portion 202a of the housing 202 along the transverse axis B to receive low pressure gas from the pressure regulator 16. The gas exits the piston chamber 248 laterally through a first housing passage 235 in the outer wall or side of housing 202. The piston chamber 248 within bore 244 can include a first groove 244b in alignment with the first housing passage 235 to facilitate the passage of gas from the piston chamber 248 into the first housing passage 235. The groove 244b can be annular. The flow meter 204 can include a flow regulating member 214, a flow body 210 and a knob 206. The flow regulating member 214 has a series of different sized orifices 52 formed in a flow regulating portion 214a for providing a desired gas flow rate. The knob 206 is secured to the flow regulating member 214 to rotate the flow regulating portion 214a for selecting the desired orifice 52 and flow rate. A second housing passage 239 through the outer wall or side of the housing 202 allows regulated gas from the flow meter 204 to reenter the housing 202 and exit the gas regulator 200 through the outlet passage 251 of the outlet nozzle member 208.

A more detailed description of one embodiment of regulator 200 now follows. The generally cylindrical portion 202a of housing 202 can have a flattened surface 203 on the side to which the flow meter 204 is mounted. The flow body 210 can be mounted to the flattened surface 203 by screws 226 extending through counterbored holes 264 in flow body 210 and into threaded holes 230 in flattened surface 203. The flow body 210 can be sealed against the flattened surface 203 of the housing 202 by a seal 228a, such as an O-ring positioned within a groove 228 in the flattened surface 203. The groove 228 can be annular. The first housing passage 235 extends from the groove 244b in the piston chamber 248 through the flattened surface 203 of the generally cylindrical portion 202a of housing 202. The first housing passage 235 can include a recessed region 234 formed in the flattened surface 203, for example, a recessed elongated slot. An opening 236 extends from the recessed region 234 into the groove 244b in bore 244. The second housing passage 239 can be positioned adjacent to the first housing passage 235 and extend from the flattened surface 203 into a second groove 244a in the bore 244. The groove 244a can be annular. The second housing passage 239 can include a counterbore portion 238 and a hole 240 extending from the counterbore portion 238 into the bore 244.

Figure 9:
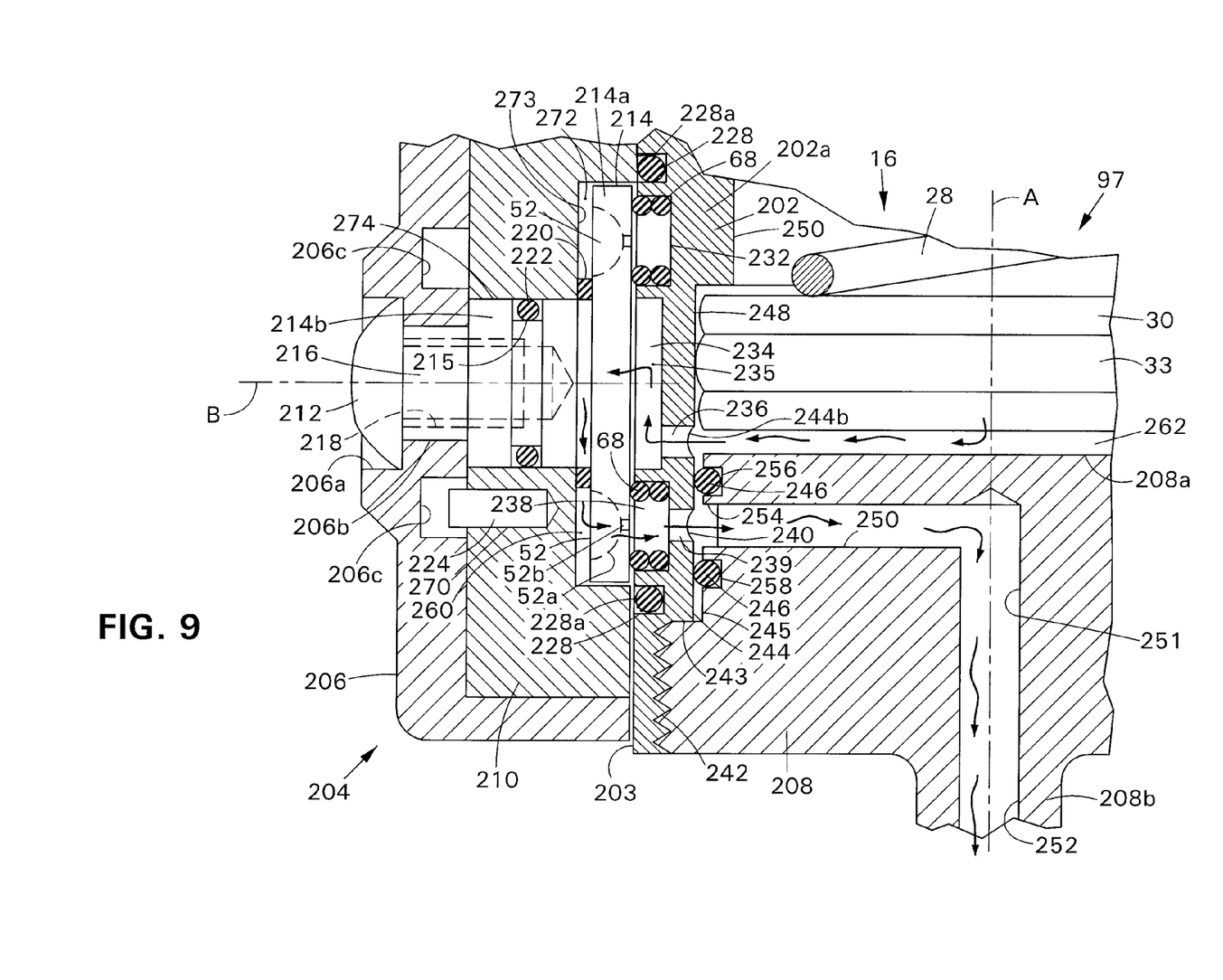
FIG. 9 is an enlarged sectional view of a portion of the regulator of FIG. 6 depicting the gas flow path.
Figure 10:
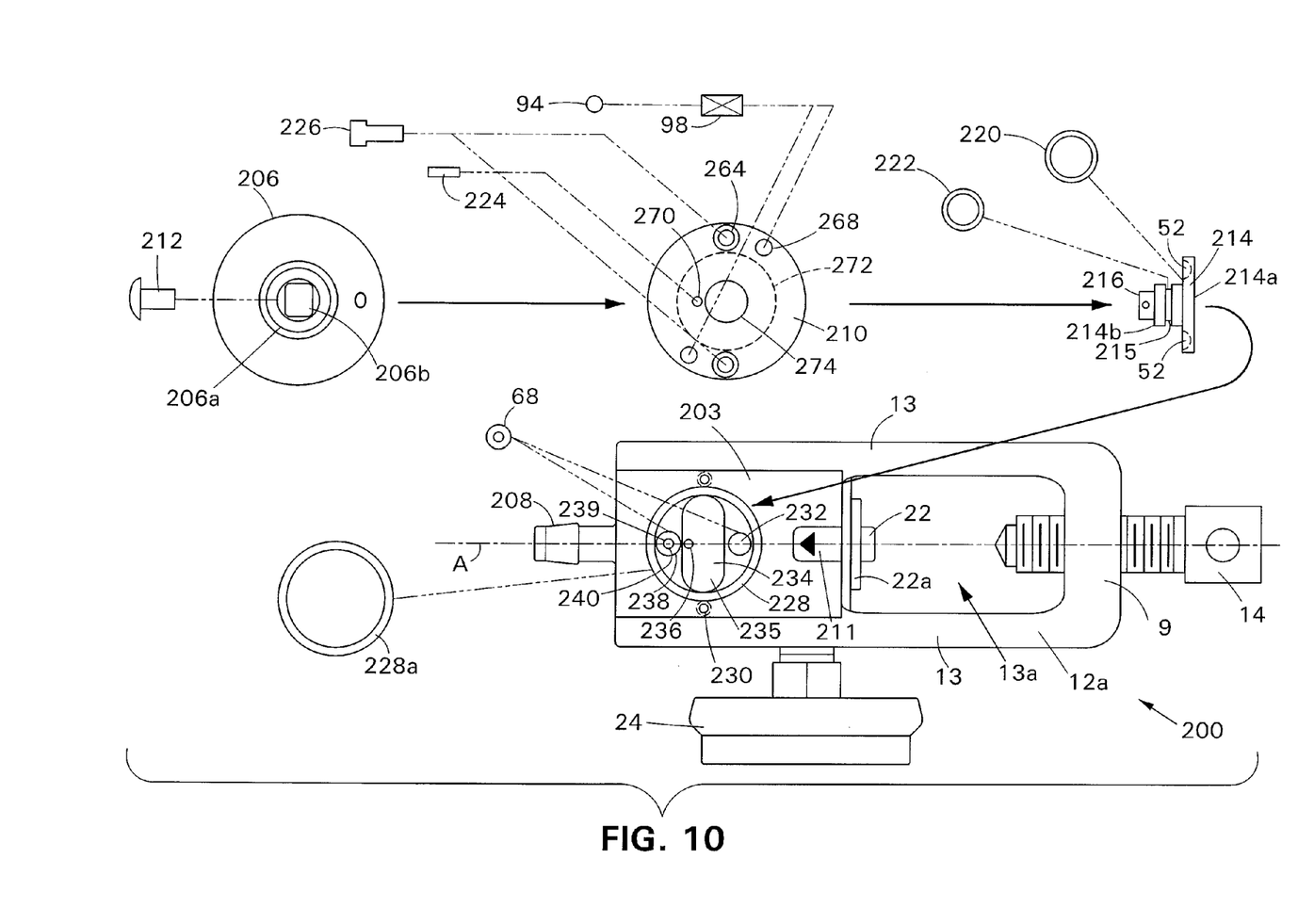
FIG. 10 is an exploded view of some of the components of the gas regulator of FIG. 6.
Figure 11:
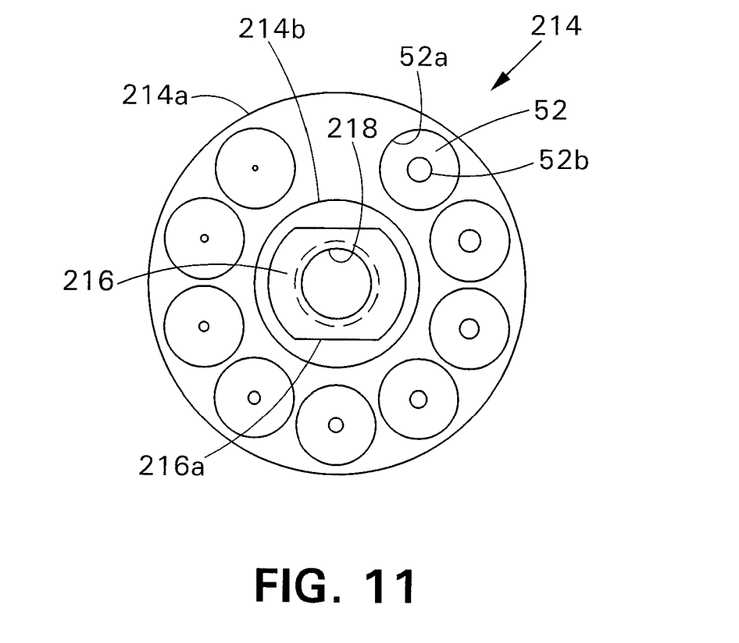
FIG. 11 is a top view of an embodiment of a flow regulating member.
Figure 12:
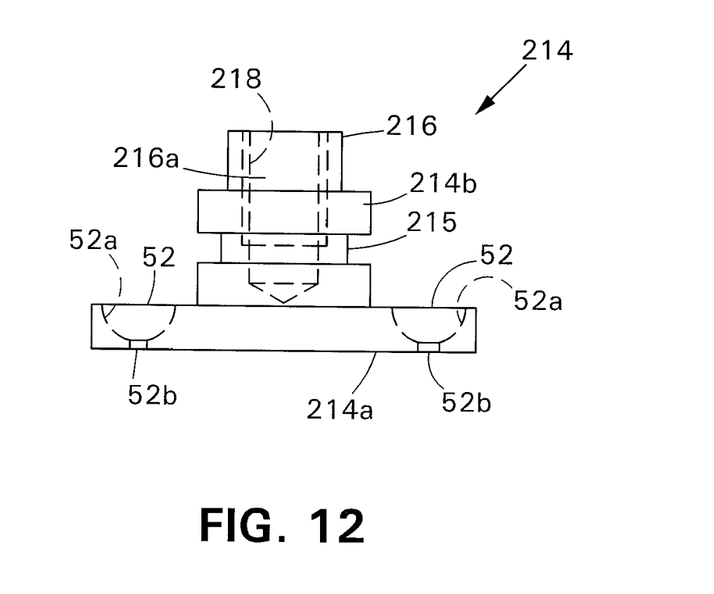
FIG. 12 is a side view of the flow regulating member of FIG. 11.

The flow regulating member 214 can be rotatably positioned against the flattened surface 203 by the flow body 210 over the first 235 and second 239 housing passages (FIGS. 8-10). The flow regulating portion 214a of the flow regulating member 214 can be generally disc shaped (FIGS. 11 and 12) and rotatably positioned within a bore or cavity 272 within the flow body 210. The recessed region 234 of the first housing passage 235 extends beyond the periphery of flow regulating portion 214a and the cavity 272 can have a diameter that is larger than the diameter of the flow regulating portion 214a to permit the passage of gas around the periphery of the flow regulating portion 214a. The flow regulating member 214 has a bushing portion 214b which extends from the flow regulating portion 214a through a hole 274 in the flow body 210. A spacer 220 can be fitted on the bushing portion 214b against the flow regulating portion 214a to space the flow regulating portion 214a slightly away from the lateral downstream surface 273 of the cavity 272 to form a gap 260. Gas flowing from the recessed region 234 of the first housing passage 235 into the cavity 272 around the flow regulating portion 214a enters the gap 260. The bushing portion 214b has a neck 215 in which a seal 222 such as an O-ring can be positioned for sealing between the bushing portion 214b and the hole 274 of the flow body 210 so that gas does not escape through that joint from the gap 260.

A sealing arrangement such as two O-rings 68 can be positioned within the counterbore portion 238 of the second housing passage 239 for sealing between the flow regulating portion 214 and the second housing passage 239 for sealing a gas flow path from the gap 260 through the orifice 52 back into the housing 202 through the second housing passage 239. A second sealing arrangement such as two O-rings 68 can be positioned in a bore 232 on the opposite side of axis B to provide symmetrical loading or contact against the flow regulating portion 214a. The groove 228 and seal 228a surround the first 235 and second 239 housing passages, and the bore 232, and can be located beyond the periphery of the flow regulating portion 214a.

The flow body 210 can be generally annular and disc shaped. The knob 206 can be secured to the bushing portion 214b of the flow regulating member 214 with a screw 212 extending through a counterbored hole 206a in the knob and into a threaded hole 218 in the bushing portion 214b. The bushing portion 214b can have a protrusion 216 having flats 216a on opposite sides for engaging a rectangular opening 206b within the knob 206 for locking the knob 206 to the flow regulating member 214. The knob 206 can be generally cup shaped and wrap around the sides of the flow body 210 to achieve a low or compact profile (FIG. 8). A pair of springs 98 and balls 94 can be positioned within bores 268 in flow body 210 (FIG. 10) for resiliently engaging detents on the inner surface of the knob 206. A pin 224 can be fitted within a hole 270 in the flow body 210 for engaging a curved slot 206c in the knob 206. The curved slot 206c extends in a partial circular path to provide the knob 206 with partial rotation. To select the desired gas flow rate, the flow rate number on the knob 206 (FIG. 7) is aligned with the indicator pointer 211 protruding from the housing 202. This aligns the orifice 52 associated with the selected gas flow rate with the second housing passage 239 for delivering the selected flow rate of gas into the outlet nozzle member 208.

The outlet nozzle member 208 can be unitary and include an elongate nozzle stem 208b extending from the bulkhead 208a along the longitudinal axis A which terminates in a nozzle outlet 44a for attachment to tubing 5 (FIG. 1). The outlet nozzle member 208 can include a threaded male diameter portion 241 which engages a female threaded portion 242 at the longitudinal end of housing 202 and abuts an internal shoulder 243 within the housing 202 for securing the outlet nozzle member 208 to the housing 202 (FIG. 8). This allows the bulkhead 208a of the outlet nozzle member 208 to be positioned inside the housing in a compact manner. In other embodiments, the outlet nozzle member 208 can engage an external shoulder.

A diameter portion 245 of the outlet nozzle member 208 can engage the bore 244 of housing 202. The diameter portion 245 can have a groove 254, such as an annular groove for alignment with the second housing passage 239. A lateral passage portion 250 of the outlet passage 251 extends through groove 254 and can be aligned with the second housing passage 239 and/or the groove 244a. The grooves 244a and 254 allow the flow of gas from the second housing passage 239 into the lateral passage portion 250 even when the passage portion 250 is not in direct alignment with passage 239. The lateral passage portion 250 extends inwardly into the nozzle outlet member 208 until reaching a longitudinal passage portion 252 which extends along the axis A. Sealing members 246, such as O-rings, can be positioned on the diameter 245 of the nozzle outlet member 208, on opposite sides of the second housing passage 239 and grooves 254 and 244a, to provide sealing between the second housing passage 239 and the lateral passage portion 252 of the outlet passage 251. The seals 246 can be O-rings which are positioned within annular grooves 256 and 258.

The positioning of the flow meter 204 laterally adjacent to the longitudinal axis of the pressure regulator 16 and the outlet nozzle member 208 provides gas regulator 200 with a compact design. In one embodiment, the length of housing 202 can be about 3.32 inches long including the yoke portion 12a. Although the flow meter 204 has been shown to be mounted to a flattened surface 203 on the housing 202, in other embodiments, the flow body 210 can be made with a curved mating surface for mounting to a cylindrical surface of the housing 202. In addition, although the flow regulating portion 214a of the flow regulating member 214 has been shown to be mounted to the side of the housing 202, in other embodiments, the flow regulating portion 214a can be positioned within an appropriate cavity within the housing 202. In such an embodiment, the wall thickness in the appropriate region can be increased. Furthermore, in other embodiments, the nozzle stem 208b can extend from the bottom of the outlet nozzle member 208 at a position parallel to the longitudinal axis A, or perpendicular to the longitudinal axis. The nozzle stem 208b can also be formed with a right-angled bend. Also, the nozzle stem 208b can extend from the side of the housing 202 and/or outlet nozzle member 208 perpendicular to the longitudinal axis A.

Inner components of the gas regulator 200 can be interlocked within housing 202 in a similar manner previously described above with respect to gas regulator 10.

While this invention has been particularly shown and described with references to particular embodiments thereof, it will be understood by those skilled in the art that various changes in form and details may be made therein without departing from the scope of the invention encompassed by the appended claims.

For example, although particular materials have been described for some of the components, it is understood that other suitable materials can be used. Other metals such as bronze, stainless steel and plated metals can be used instead of or in combination with brass and aluminum. Some embodiments of gas regulators can have only a pressure regulator or only a flow meter. Features of the embodiments can be omitted or combined. In addition, although some of the components and gas flow paths are shown centered along a central axis A, in some embodiments, various components and flow paths do not have to be centered. Furthermore, although the gas regulator has been described for delivering oxygen to a patient, it is understood that other medical gases can be delivered, for example, nitrous oxide. In addition, non-therapeutic gas can be delivered such as lethal gases, or industrial gases for manufacturing processes. Finally, although some of the components have been shown and described in some embodiments to have particular shapes such as circular, cylindrical, annular, disk-shaped, etc., other shapes are possible.

What is claimed is:

1. A gas flow device comprising:
    a housing having a longitudinal axis;
    a pressure regulator positioned within the housing along the longitudinal axis for controlling pressure of gas received from a pressurized source;
    a flow meter for controlling flow rate of the gas received from the pressure regulator, the flow meter being positioned relative to the housing transverse to the longitudinal axis; and
    an outlet nozzle member having a nozzle stem, the outlet nozzle member being positioned along the longitudinal axis, the outlet nozzle member for receiving the gas from the flow meter and delivering the gas through the nozzle stem.

2. The device of claim 1 in which the nozzle stem is positioned along the longitudinal axis for delivering the gas through the nozzle stem along the longitudinal axis.

3. The device of claim 2 in which the flow meter comprises:
    a flow body mounted to the housing;
    a flow regulating member having a flow regulating portion rotatably positioned within the flow body about the transverse axis, the flow regulating portion having a series of different sized orifices for selecting a desired flow rate of gas; and
    a knob secured to the flow regulating member for causing rotation of the flow regulating portion for selecting the desired flow rate of gas.

4. The device of claim 3 in which the housing has a generally cylindrical housing portion with an outer wall, the pressure regulator being positioned within the generally cylindrical housing portion along the longitudinal axis, a portion of the outer wall of the generally cylindrical housing portion having a flattened surface to which the flow body of the flow meter is mounted, the generally cylindrical housing portion also having first and second housing passages extending through the flattened surface of the outer wall to provide gas flow to and from the flow meter.

5. The device of claim 4 in which the first housing passage includes a recessed region formed in the flattened surface extending through a partial thickness of the outer wall, and an opening extending from the recessed region through a remaining thickness of the outer wall for communication with the pressure regulator, the recessed region extending beyond the periphery of the flow regulating portion for providing gas flow around the flow regulating portion.

6. The device of claim 5 further comprising a sealing arrangement surrounding the second housing passage for sealing between the flow regulating portion of the flow regulating member and the second housing passage for providing a sealed path through a selected orifice of the flow regulating portion aligned with the second housing passage.

7. The device of claim 6 in which the flow body has a cavity in which the flow regulating portion is positioned, the cavity being sized and configured such that gas can flow out of the housing from the recessed region and into the cavity of the flow body past the flow regulating portion for passage back into the housing through the selected orifice aligned with the second housing passage.

8. The device of claim 4 in which the outlet nozzle member is secured within the generally cylindrical housing portion and includes an outlet passage with a lateral portion that is in communication with the second housing passage and a longitudinal portion extending from the lateral portion along the longitudinal axis.

9. The device of claim 8 in which the outlet nozzle member is a unitary member having a bulkhead with the nozzle stem extending from the bulkhead.

10. A method of controlling gas flow comprising:
positioning a pressure regulator within a housing along a longitudinal axis for controlling pressure of gas received from a pressurized source;
controlling flow rate of the gas received from the pressure regulator with a flow meter, the flow meter being positioned relative to the housing along a transverse axis of the housing;
receiving gas from the flow meter in an outlet nozzle member having a nozzle stem, the outlet nozzle member being positioned along the longitudinal axis; and
delivering the received gas delivery through the nozzle stem.

11. The method of claim 10 wherein the nozzle stem is positioned along the longitudinal axis, further comprising delivering the gas through the nozzle stem along the longitudinal axis.

12. A method of fabricating a gas flow device comprising:
fabricating a housing having a longitudinal axis;
assembling a pressure regulator for controlling pressure of gas received from a pressurized source;
positioning the pressure regulator within the housing along the longitudinal axis;
assembling a flow meter for controlling flow rate of the gas received from the pressure regulator;
positioning the flow meter relative to the housing transverse to the longitudinal axis; and
positioning an outlet nozzle member having a nozzle stem along the longitudinal axis such that the outlet nozzle member receives the gas from the flow meter for delivery through the nozzle stem.

13. The method of claim 12 further comprising positioning the nozzle stem is along the longitudinal axis for delivering the gas through the nozzle stem along the longitudinal axis.

14. The method of claim 13 in which the fabricating flow meter comprises:
mounting a flow body to the housing;
rotatably positioning a flow regulating member having a flow regulating portion within the flow body about the transverse axis, the flow regulating portion having a series of different sized orifices for selecting a desired flow rate of gas; and
securing a knob to the flow regulating member for causing rotation of the flow regulating portion for selecting the desired flow rate of gas.

15. The method of claim 14 further comprising:
fabricating the housing having a generally cylindrical housing portion with an outer wall; and
positioning the pressure regulator within the generally cylindrical housing portion along the longitudinal axis, a portion of the outer wall of the generally cylindrical housing portion having a flattened surface to which the flow body of the flow meter is mounted, the generally cylindrical housing portion also having first and second housing passages extending through the flattened surface of the outer wall to provide gas flow to and from the flow meter.

16. The method of claim 15 further comprising:
forming a recessed region in the flattened surface of the first housing passage and extending through a partial thickness of the outer wall; and
forming an opening extending from the recessed region through a remaining thickness of the outer wall for communication with the pressure regulator, the recessed region extending beyond the periphery of the flow regulating portion for providing gas flow around the flow regulating portion.

17. The method of claim 16 further comprising fabricating a sealing arrangement surrounding the second housing passage for sealing between the flow regulating portion of the flow regulating member and the second housing passage for providing a sealed path through a selected orifice of the flow regulating portion aligned with the second housing passage.

18. The method of claim 17 further comprising:
fabricating a cavity in the flow body; and
positioning the flow regulating portion within the cavity, the cavity being sized and configured such that gas can flow out of the housing from the recessed region and into the cavity of the flow body past the flow regulating portion for passage back into the housing through the selected orifice aligned with the second housing passage.

19. The method of claim 15 further comprising:
securing the outlet nozzle member within the generally cylindrical housing portion; and
fabricating an outlet passage with a lateral portion that is in communication with the second housing passage and a longitudinal portion extending from the lateral portion along the longitudinal axis.

20. The method of claim 19 in which the outlet nozzle member is a unitary member having a bulkhead with the nozzle stem extending from the bulkhead.

* * * * *